United States Patent
Lindrose

(10) Patent No.: US 6,771,469 B2
(45) Date of Patent: Aug. 3, 2004

(54) DISC DRIVE INERTIAL HEAD-SLAP ARRESTOR

(75) Inventor: Albert Michael Lindrose, Boulder, CO (US)

(73) Assignee: Seagate Technology LLC, Scotts Valley, CA (US)

(*) Notice: Subject to any disclaimer, the term of this patent is extended or adjusted under 35 U.S.C. 154(b) by 192 days.

(21) Appl. No.: 10/128,806

(22) Filed: Apr. 24, 2002

(65) Prior Publication Data

US 2003/0086204 A1 May 8, 2003

Related U.S. Application Data

(60) Provisional application No. 60/333,029, filed on Nov. 5, 2001.

(51) Int. Cl.⁷ ............................................... G11B 21/16
(52) U.S. Cl. .................................................. 360/244.2
(58) Field of Search ............................. 360/128, 244.2, 360/244.8, 244.9

(56) References Cited

U.S. PATENT DOCUMENTS

| | | | |
|---|---|---|---|
| 5,936,803 A | 8/1999 | Berding | |
| 5,940,251 A | * 8/1999 | Giere et al. | 360/244.9 |
| 6,011,671 A | 1/2000 | Masse et al. | |
| 6,021,022 A | 2/2000 | Himes et al. | |
| 6,091,574 A | 7/2000 | Misso | |
| 6,191,915 B1 | 2/2001 | Takagi et al. | |
| 6,212,044 B1 | 4/2001 | Murakami et al. | |
| 6,327,118 B1 | 12/2001 | Perez | |

* cited by examiner

Primary Examiner—David Michael Davis
(74) Attorney, Agent, or Firm—Merchant & Gould P.C.

(57) ABSTRACT

A disc drive assembly has an actuator for moving an actuator arm above the surface of a rotating disc. A suspension connects a slider to the actuator arm and maintains the slider substantially engaged with the disc surface in the absence of a shock event. A head-slap arrestor attached to the actuator arm includes a finger extending over the suspension so that the head-slap arrestor does not contact the suspension in the absence of a shock event. The finger of the head-slap arrestor pivots into engagement with the suspension during a shock event to maintain the slider substantially engaged with the disc surface. The force applied by the finger of the head-slap arrestor to the suspension is directly related to the force of the shock event.

20 Claims, 4 Drawing Sheets

DISC DRIVE INERTIAL HEAD-SLAP ARRESTOR

CROSS REFERENCE TO RELATED APPLICATION

This application claims the benefit of U.S. provisional application Serial No. 60/333,029, filed Nov. 5, 2001, entitled "Inertial Head-Slap Arrestor for Disc Drives."

FIELD OF THE INVENTION

This application relates to magnetic disc drives and more particularly to apparatus for reducing "head-slap" when a disc drive undergoes a large shock.

BACKGROUND OF THE INVENTION

A computer disc drive includes one or more discs mounted for rotation about a spindle axis. The discs are typically coated with a magnetic medium for storage of digital information in a plurality of circular, concentric data tracks. A spindle motor rotates the discs about the axis to allow a head or "slider" carrying electromagnetic transducers to pass over each disc surface and read information from or write information to the data tracks.

The slider is typically formed from a ceramic block having a specially etched surface that forms an air "bearing" as the disc rotates beneath the slider. The lifting force provided by the air bearing surface causes the slider to lift off and "fly" a very small distance above the surface of the disc as the disc spins up to its operating speed. Although the fly height of the slider is only a fraction of a micron, this thin film of air between the slider and the disc prevents damage to the fragile magnetic coating on the surface of the disc.

The slider is preferably moved between data tracks across the surface of the disc by an actuator mechanism such as a rotary voice coil motor. The actuator includes arms attached to each of the sliders by flexible suspensions. Each suspension essentially comprises a flat sheet metal spring that exerts a controlled preload force on the slider in the vertical direction (i.e., against the surface of the disc). The preload force supplied by the suspension effectively counters the lift force generated by the slider and prevents the slider from flying too far off the surface of the disc. Although relatively flexible in the vertical direction, the suspension is relatively stiff in the lateral direction in order to provide for precise lateral positioning of the slider over the closely spaced data tracks.

Although the downward preload force supplied by the suspension is effectively countered by the lifting force generated by the slider during rotation of the disc, that same preload force typically forces the slider to rest on the surface of the disc once the disc stops spinning and the lifting force dissipates (e.g., when the disc drive is powered down). During these periods of inactivity, and particularly during assembly, shipping and handling of the disc drive before the drive is assembled within a computer, the fragile magnetic coating on the surface of the disc is susceptible to damage from accidental vertical displacement of the slider, such as by a shock event.

Vertical displacement of the slider may occur when the disc drive is subjected to a shock of sufficient magnitude to cause the suspension and the attached slider to move away from the disc surface (either on the initial shock or on a rebound from the initial shock). Although the preload force supplied by the suspension tends to hold the slider against the disc during small shocks, a sufficiently large shock (e.g., a shock 200 times the acceleration of gravity or 200 "Gs") will typically overcome the preload force and cause the slider to be pulled off the disc surface. The return impact of the slider against the disc surface can cause severe damage to the thin magnetic coating on the surface of the disc. If the shock event occurs during operation of the disc drive, the damage to the disc coating may create an unusable portion or sector of the disc and a potential loss of data stored on that portion of the disc. However, most large shock events typically occur during periods of inactivity, as described above, when the slider is positioned along an inner radial portion or "park zone" of the disc not used for data storage. Regardless of whether the impact occurs in the data region or the park zone of the disc, the impact typically generates debris particles that can migrate across the surface of the disc and interfere with the air bearing surface of the slider, thereby causing damage to more vital regions of the disc during disc operation and possibly leading to a disc "crash."

Previous efforts to minimize the above described "head-slap" phenomenon have focused on either increasing the preload force applied by the suspension or reducing the mass of the suspension to reduce the lift-off force. That is, the lift-off force equals the acceleration of the shock event (the "G-force") multiplied by the combined mass of the suspension and the slider. Therefore, a reduction in the mass of the suspension leads to a reduction in the force applied to the slider during a shock event and thus to improved shock performance for the disc drive. As an alternative to reducing the mass of the suspension, some prior art suspension designs incorporate a counterweight at a proximal end of the suspension to help balance the overall mass of the suspension. Once such design is shown in U.S. Pat. No. 5,936,803 entitled "Disc Drive Having a Mass Balanced Head Gimbal Assembly." A further alternative solution to the head-slap problem is to fix motion limiters or cushions atop the suspension to both limit the vertical displacement of the suspension and to damp the impact of the suspension.

Unfortunately, the prior art solutions of altering the design of the suspension (such as by reducing the mass of the suspension or by adding additional mass in the form of a counterweight) and of adding cushions/motion limiters to the suspension in order to improve the shock resistance of the suspension can be detrimental to the primary function of the suspension. Specifically, the most important function of the suspension is to accurately position the slider over the densely spaced data tracks. Toward this end, disc drive suspensions are optimized to move in both a lateral direction but also to provide resiliency in the vertical direction to allow the slider to follow small oscillations in the surface of the disc as the disc rotates about the spindle axis. However, when the design of these optimized suspensions is altered as described above to combat the head-slap phenomenon, the result is typically a reduction in the "normal" operating performance of the suspension. That is, when the suspension is called upon to perform additional tasks such as reducing head-slap, it is likely that the new task will interfere with the primary task (e.g., track following) performed by the suspension. This trade-off in performance of the suspension is particularly inefficient since the "new task" (high G-force shock protection) occurs only rarely, if at all, during the life of the disc drive.

Accordingly, there is a need to reduce the damage caused by the "head-slap" phenomenon while not interfering with the basic design of the disc drive suspension. The present invention provides a solution to this and other problems, and offers other advantages over the prior art.

SUMMARY OF THE INVENTION

The present relates to a disc drive that includes a pivotal elongated member attached to an end of an actuator arm for contacting a suspension of the disc drive only during a shock event, thereby preventing or substantially reducing damage to the disc resulting from a head-slap.

In accordance with one embodiment of the present invention, a disc drive assembly has an actuator for moving an actuator arm above the surface of a rotating disc. A suspension connects a slider to the actuator arm to maintain the slider substantially engaged with the disc surface in the absence of a shock event. A head-slap arrestor attached to the actuator arm includes a finger extending over the suspension, wherein a distal end of the finger pivots between a first position at a predetermined height above the suspension, in the absence of a shock event, and a second position engaging the suspension during a shock event to maintain the slider substantially engaged with the disc surface. The head-slap arrestor may be implemented as a paddle pivotally attached to the actuator arm and secured to a proximal end of the finger along a hinge axis to allow for pivoting motion of the paddle and the finger about the hinge axis.

The present invention can also be implemented as a head-slap arrestor for a disc drive wherein the disc drive includes an actuator arm that moves above the surface of a spinning disc, and wherein a slider is connected to the actuator arm by a suspension to maintain the slider substantially engaged with the disc surface in the absence of a shock event. The head-slap arrestor includes attachment feet adapted to be secured to the actuator arm and a paddle secured to the attachment feet along a hinge axis so that the paddle is suspended above the attachment feet. A finger includes a proximal end attached to the paddle along the hinge axis and a distal end extending away from the paddle so that the paddle and the finger pivot in opposite directions about the hinge axis. The distal end of the finger is adapted to extend a predetermined height above the suspension in the absence of a shock event, and is further adapted to pivot about the hinge axis and engage the suspension to maintain the slider substantially engaged with the disc surface during a shock event.

Yet another embodiment of the present invention may be described as a disc drive assembly having a suspension maintaining a slider substantially engaged with a surface of a disc in the absence of a shock event. The invention includes a means for applying a force to the suspension to maintain the slider substantially engaged with the disc surface when the disc drive assembly undergoes a shock event. The means for applying a force to the suspension includes means for scaling the force to match a force of the shock event. The means may further include an elongated member pivotally attached to an actuator arm of the disc drive wherein the elongated member does not engage the suspension in the absence of a shock event.

These and various other features as well as advantages which characterize the present invention will be apparent from a reading of the following detailed description and a review of the associated drawings.

DETAILED DESCRIPTION

Figure 1:
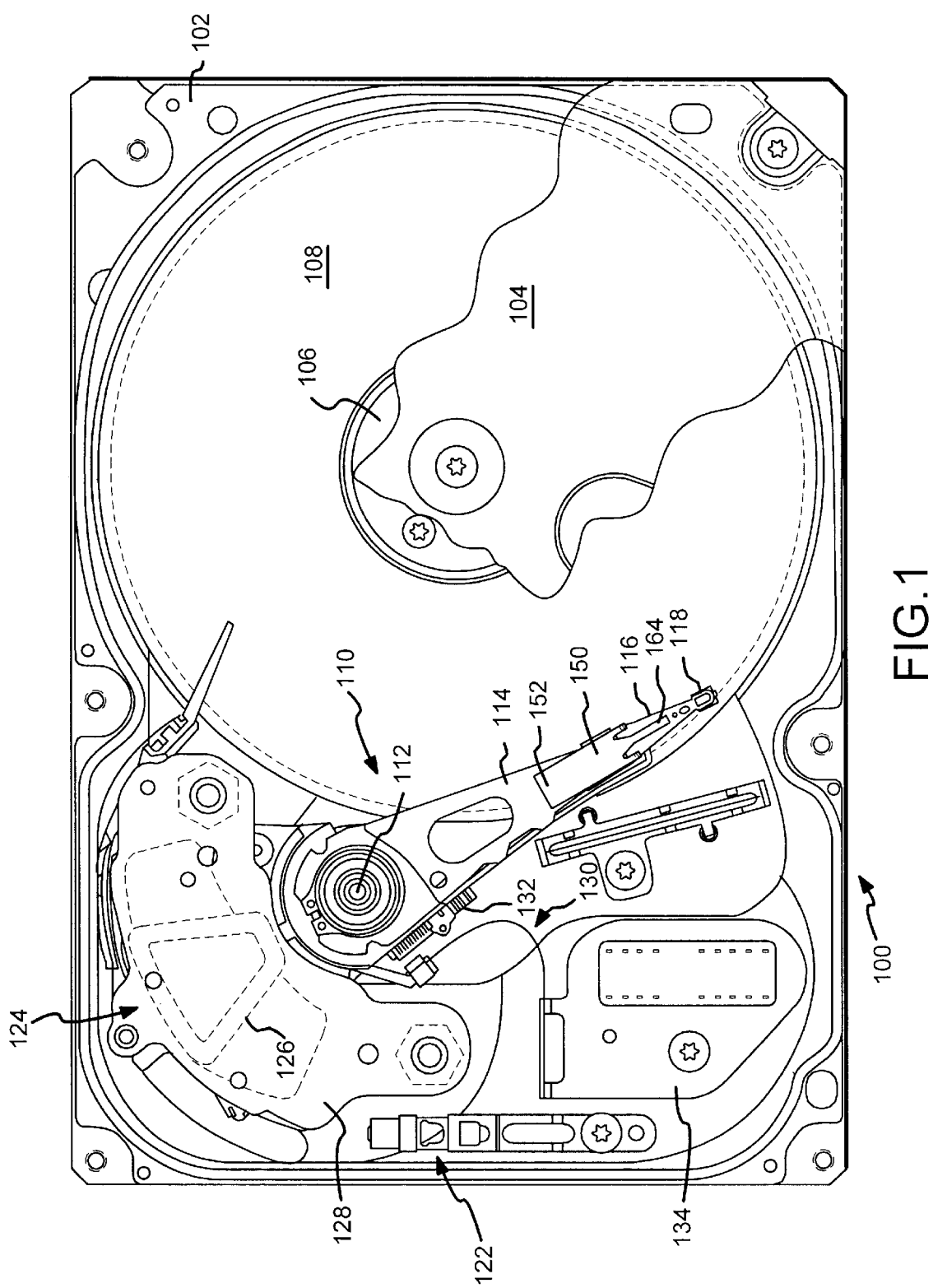
FIG. 1 is a perspective view of a disc drive incorporating an embodiment of a head-slap arrestor of the present invention attached to an actuator arm of the disc drive, with a top cover of the disc drive partially broken away.

A disc drive 100 constructed in accordance with a preferred embodiment of the present invention is shown in FIG. 1. The disc drive 100 includes a base plate 102 to which various components of the disc drive 100 are mounted. A top cover 104, shown partially cut away, cooperates with the base 102 to form an internal, sealed environment for the disc drive in a conventional manner. The components include a spindle motor 106 which rotates one or more discs 108 at a constant high speed. Information is written to and read from tracks on the discs 108 through the use of an actuator assembly 110, which rotates about a bearing shaft assembly 112 positioned adjacent the discs 108. The actuator assembly 110 includes a plurality of actuator arms 114 which extend towards the discs 108, with one or more suspensions or flexures 116 extending from each of the actuator arms 114. Mounted at the distal end of each suspension 116 is a head or "slider" 118 which includes an air bearing enabling the slider 118 to fly in close proximity above the corresponding surface of the associated disc 108.

The spindle motor 106 is typically de-energized when the disc drive 100 is not in use for extended periods of time. The slider 118 is moved over a park zone near the inner diameter of the disc 108 when the drive motor is de-energized. The slider 118 is secured over the park zone through the use of an actuator latch arrangement 122, which prevents inadvertent rotation of the actuator arms 114 when the slider is parked.

The radial position of the slider 118 is controlled through the use of a voice coil motor 124, which typically includes a coil 126 attached to the actuator assembly 110, as well as one or more permanent magnets and return plates 128 which are spaced apart to establish a vertical magnetic field within which the coil 126 is immersed. The controlled application of current to the coil 126 causes magnetic interaction between the permanent magnets 128 and the coil 126 so that the coil 126 moves in accordance with the well known Lorentz relationship. As the coil 126 moves, the actuator assembly 110 pivots about the bearing shaft assembly 112 and the slider 118 is caused to move across the surface of the disc 108.

A flex assembly 130 provides the requisite electrical connection paths for the actuator assembly 110 while allowing pivotal movement of the actuator assembly 110 during operation. The flex assembly includes a printed circuit board 132 to which head wires (not shown) are connected; the head wires being routed along the actuator arms 114 and the suspensions 116 to the heads 118. The printed circuit board 132 typically includes circuitry for controlling the write currents applied to the heads 118 during a write operation and for amplifying read signals generated by the heads 118 during a read operation. The flex assembly terminates at a flex bracket 134 for communication through the base plate 102 to a disc drive printed circuit board assembly (not shown) mounted to the bottom side of the disc drive base plate 102.

As seen in FIG. 1, one embodiment of a head-slap arrestor 150 of the present invention is shown attached to the top arm 114 so that a finger of the head-slap arrestor 150 extends over the suspension 116. As described in greater detail below, the head-slap arrestor 150 combats the problem of head-slap experienced during a high G-force shock event. While such shocks are typically experienced in a non-operational mode of the disc drive 100 (e.g., during shipment or installation of the drive within a computer), the head-slap arrestor 150 of the present invention also operates to prevent or reduce head-slaps that may occur during operation of the drive 100.

Figure 2:
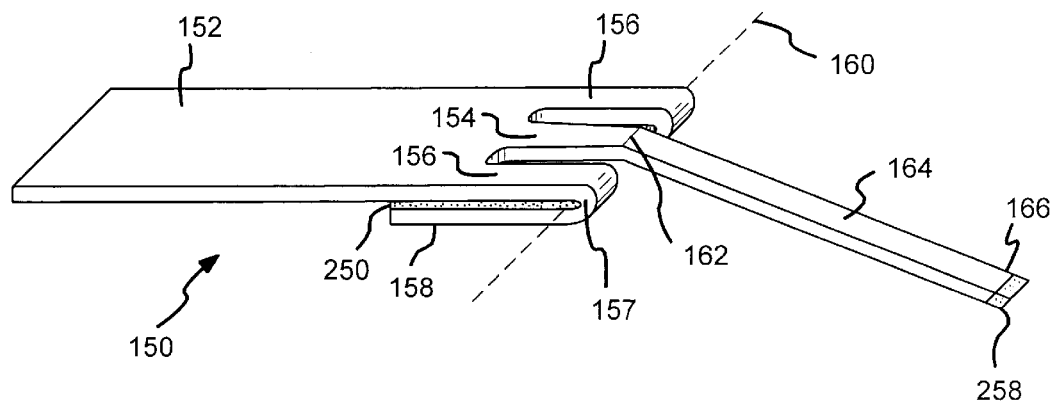
FIG. 2 is an enlarged perspective view of the head-slap arrestor shown in FIG. 1 shown separately from the actuator arm.

Referring now to FIG. 2, an enlarged perspective view of the head-slap arrestor 150 is shown. The head-slap arrestor 150 includes a relatively large base or paddle portion 152 having a central tab 154 and a pair of spring legs 156 extending from one end. The spring legs 156 extend from an end of the arrestor 150 opposite the paddle 152, and each spring leg 156 preferably folds backward upon itself at a U-shaped bend region 157 to form an attachment foot 158 that extends below and parallel to the spring leg 156. That is, the two opposite attachment feet 158 are secured to (and in the preferred embodiment are formed integrally with) the spring legs 156 to form a spring hinge axis 160 at the bend region 157, as shown in FIG. 2.

Figure 3:
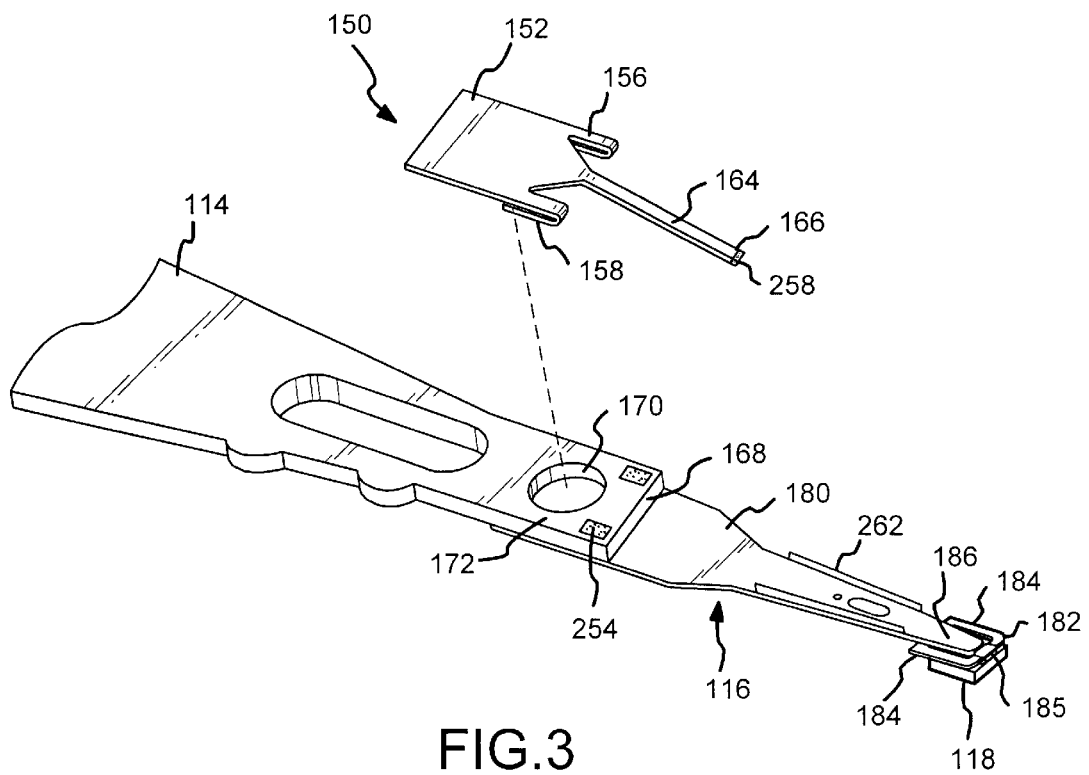
FIG. 3 is an enlarged, exploded perspective view of the head-slap arrestor and actuator arm shown in FIG. 1.
Figure 4:
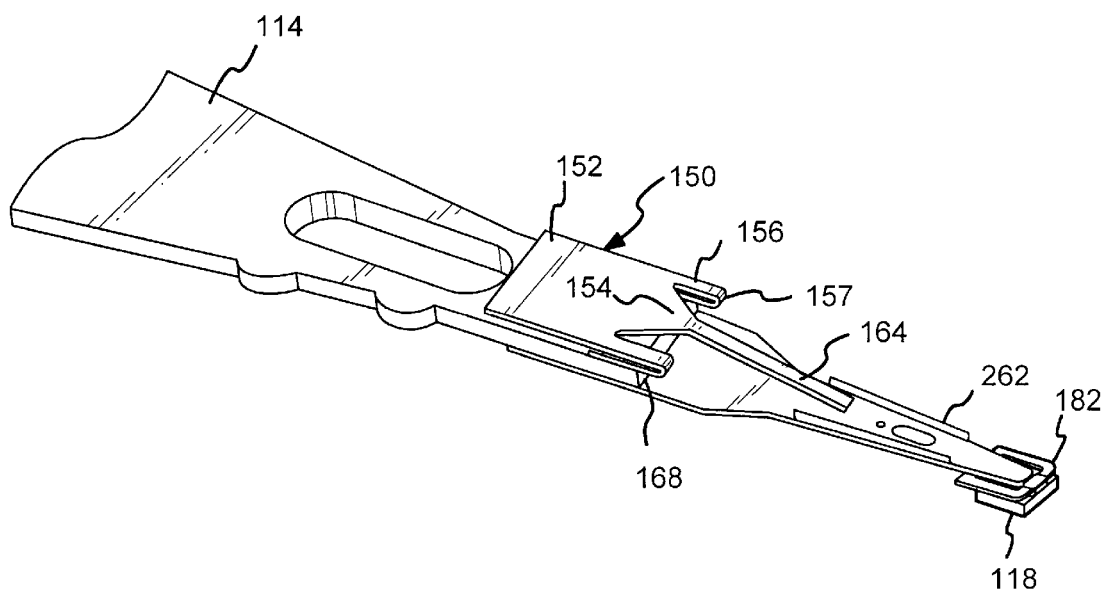
FIG. 4 is an enlarged perspective of the assembled head-slap arrestor and actuator arm shown in FIG. 1 illustrating a finger of the head-slap arrestor extending over a suspension attached to a distal end of the actuator arm.
Figure 5:
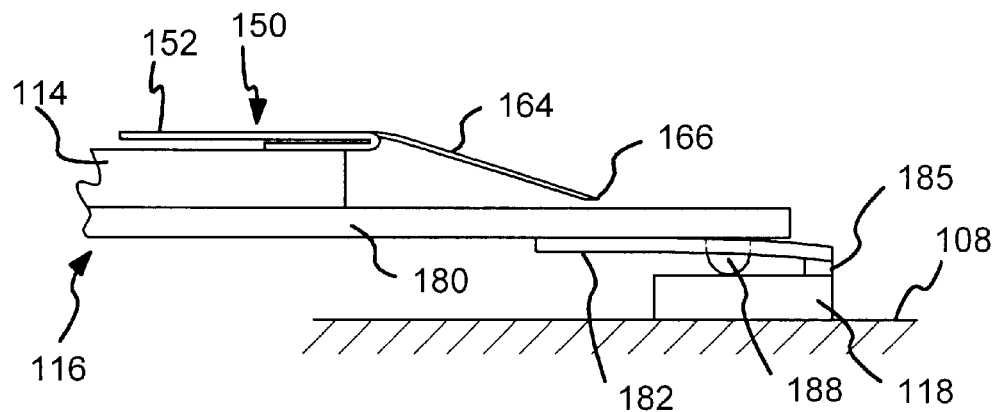
FIG. 5 is a side elevational view of the actuator arm and suspension shown in FIG. 4 together with a disc surface, illustrating a distal end of the head-slap arrestor positioned above the suspension so as to not contact the suspension during normal operation of the disc drive shown in FIG. 1.

As noted above, a central tab 154 extends from the paddle portion 152 of the head-slap arrestor 150 between the two spring legs 156. A distal end 162 of the central tab 154 is preferably positioned to lie along the hinge axis 160 as shown in FIG. 2. A finger 164 extends from the distal end 162 of the central tab 154 and is preferably bent to extend downward below the paddle portion 152, as best shown in FIG. 5. In the embodiment shown in the drawing, the finger 164 is bent downward at the junction with the distal end 162 of the central tab 154. However, in other embodiments, the finger 164 may be bent or curved along other segments of the finger (e.g., at the middle of the finger) provided that a distal end or tip 166 of the finger 164 extends downward toward the suspension 116 when the head-slap arrestor 150 is mounted to the actuator arm 114 as shown in FIGS. 3 and 4. Indeed, the length of the finger 164 and the extent or angle of the downward bend may vary as required for use with different sized suspensions 116.

Referring to FIGS. 3 and 4, the head-slap arrestor 150 is attached adjacent a distal end 168 of the actuator arm 114. In the embodiment shown in FIGS. 3 and 4, the attachment feet 158 are secured on either side of a through hole 170 formed adjacent the distal end 168 of the arm 114. The through hole 170 is used to mount a proximal end of the suspension 116 to the distal end of the arm 114 using a ball-swage process well known in the art. Specifically, each attachment foot 158 is preferably secured to a land portion 172 of the actuator arm located on either side of the hole 170. In the disclosed embodiment, the attachment feet 158 are positioned so that the U-shaped bend regions 157 and the hinge axis 160 extend slightly beyond the distal end 168 of the actuator arm 114. In this manner, the finger 164 is allowed to pivot freely and the tip 166 of finger 164 is preferably positioned immediately above the suspension 116 (but without touching the suspension 116 during normal drive operation), as shown in FIGS. 4 and 5. The distance between the tip 166 and the surface of the suspension 116 during normal operating conditions is referred to below as the "stand-off height," and in the embodiment shown in FIG. 5 the stand-off height is approximately 0.125 millimeters.

The suspension 116 is typically formed from two pieces of thin stainless steel: a relatively stiff load beam 180 and a relatively flexible gimbal 182 which, in turn, is attached to the slider 118. A first or proximal end of the load beam 180 is attached to the actuator arm 114 at the through hole 170 as described above. The load beam 180 includes a relatively flexible bend region adjacent the distal end 168 of the actuator arm 114 that is typically bent downward toward the surface of the disc 108 to supply a preload force to the slider 118. The slider 118 is not attached directly to the load beam 180, but rather is attached to the more flexible gimbal 182, and the gimbal in turn is attached to a distal end of the load beam 180 (such as by spot welding).

The gimbal 182 includes a cutout region defining two parallel flexure beams 184 and a cross member defining an attachment pad 185 for attaching the slider 118. A tongue 186 at the distal end of the load beam 180 protrudes within into the cutout region of the gimbal 182 so that a dimple 188 on the bottom of the load beam 180 contacts a top surface of the slider 118 to transfer the preload force directly to the slider 118. The attachment pad 185 of the gimbal 182 is secured to the top surface of the slider 118, such as by an adhesive, so that the flexure beams 184 provide a resilient connection between the slider 118 and the relatively stiff load beam 180. The resilient connection provided by the gimbal 182 is important to allow the slider 118 to pitch and roll (i.e., "gimbal") while following the topography of the rotating disc 108.

As described above, it is the preload force applied by the load beam 180 that counters the lifting force generated by the air bearing slider of the slider 118 during normal operation of the disc drive 100. However, during periods of inactivity when the disc 108 is not spinning, the preload force urges the slider 118 to rest on the park zone of the disc 108. It is during such inactive periods, and particularly during shipping and handling of the drive prior to installation within a computer, that the drive is most susceptible to the above-described head-slap phenomenon. That is, shock events that cause a vertical displacement of the drive 100 will tend to overcome the preload force applied by the load beam 180 and lift the slider 118 off of the disc surface.

The head-slap arrestor 150 helps to counter the lift-off tendency of the slider 118 by providing a counter-force to the suspension 116 during a shock event. Specifically, the tip 166 of the finger 164 is poised directly over the suspension 116 during normal drive operations as shown in FIG. 5. In the event of a vertical shock that applies an upward force to the slider 118 and the suspension 116 (see force arrow 200 in FIG. 6), the same upward acceleration acts on the head-slap arrestor 150. That is, the relatively heavy paddle portion 152 is subjected to an upward force acting through its center of gravity as shown by force arrow 202 in FIG. 6. A similar upward force is experienced by the finger 164 as shown by the force arrow 203 in FIG. 6. Note that the force arrow 202 is longer than the force arrow 203 because the paddle portion 152 is preferably larger (i.e. heavier) than the finger 164. Because the spring legs 156 and the attachment feet 158 form a spring hinge along the axis 160 (FIG. 2), the head-slap arrestor 150 essentially acts as a teeter-totter during a shock event. The relatively large upward force 202 on the paddle portion 152 thus creates a clockwise torque in FIG. 6 about the axis 160 which is countered by a counter-clockwise torque created by the upward force 203 acting on the finger 164 itself. Because the moment arms for both the paddle portion and the finger (i.e., the distance between the respective mass centers and the axis 160) are approximately the same, the counter-torque applied by the finger 164 is much smaller than the torque generated by the paddle portion 152 due to the relatively large mass of the paddle portion. Thus, in response to an upward shock force, the arrestor 150 will experience a net clockwise torque as indicated by the curved arrow 204 in FIG. 6.

Figure 6:
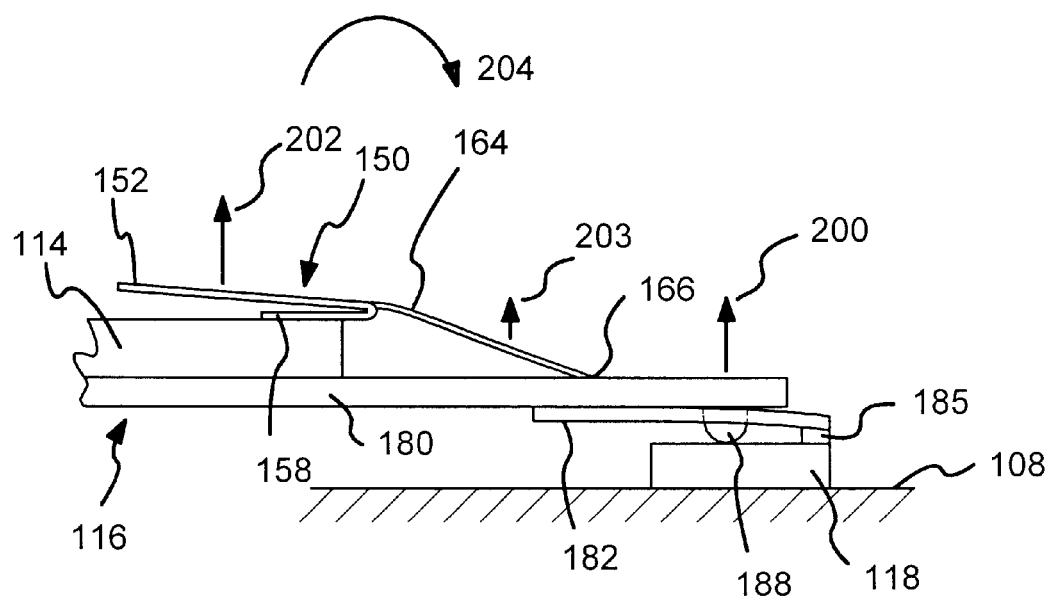
FIG. 6 is a side elevational view similar to FIG. 5 illustrating a shock event tending to force the suspension in an upward direction and showing contact between the distal end of the head-slap arrestor and the suspension to maintain a slider of the suspension in contact with the disc surface.

The net clockwise torque 204 is applied as a retaining force by the end of the finger 164 to the load beam 180 of the suspension 116 as shown in FIG. 6. Furthermore, because the net clockwise torque 204 is greater than the torque created by the lift-off force 200 experienced by the combination of the slider 118 and the suspension 116, the retaining force applied by the head-slap arrestor 150 tends to maintain the slider 118 on the disc surface during the shock event. Indeed, this will always be the case for any upward vertical acceleration provided that the size (i.e., the effective moment arm) and mass of the head-slap arrestor 150 are selected to provide a torque that is greater than the torque created by the lift-off force 200 applied to the slider 118. Thus, by relying on the torque generated by the head-slap arrestor 150 as opposed to just its shear mass, the present invention may utilize a paddle portion 152 that is lighter than the combination of the slider 118 and the suspension 116 while still providing a sufficient retaining force to maintain the slider 118 in contact with the disc surface. Additionally, disc drive designers may further reduce the overall mass of the head-slap arrestor 150 by lengthening the paddle portion 152 to increase the effective moment arm of the arrestor 150.

It should be emphasized that the head-slap arrestor 150 is an inertial system rather than a stored energy system (e.g., a spring), and therefore the magnitude of the downward force applied by the finger 164 to the suspension 116 scales relative to the magnitude of the shock event. Thus, contrary to fixed preload force applied by the bend region of the load beam 180, there is no "preset" amount of force applied by the head-slap arrestor 150 that would limit the effectiveness of the arrestor 150 in the case of high G-force shock events. Indeed, the head-slap arrestor 150 has been shown to dramatically reduce the head-slap phenomenon in disc drives under test conditions where the drive was exposed to shock events exceeding 700 Gs.

Furthermore, due to the inertial nature of the head-slap arrestor 150, and the nominal separation or stand-off height between the tip 166 of the finger 164 and the suspension 116 shown in FIG. 5, it is clear that the arrestor 150 is completely passive (i.e., does not interfere with the suspension 116 and the slider 118) during normal operation of the disc drive 100. This is a significant improvement over prior art head-slap reduction techniques where the suspensions themselves have been modified or where cushions/motion limiters have been placed on the suspensions in order to reduce the tendency of the slider 118 to lift off the disc 108 during a shock event. Specifically, the head-slap arrestor 150 allows the suspension 116 to be optimized for normal operating conditions rather than for the comparatively rare instance of a large shock event. Prior art solutions that modify the suspension itself (such as U.S. Pat. No. 5,936,803) or that place cushions or other motion limiters on the suspension necessarily compromise the performance of the suspension during normal operating conditions in order to achieve a higher level of shock resistance. Additionally, by preventing contact between the head-slap arrestor 150 and the suspension in the absence of a shock event, the present invention can be utilized with any type of existing or future suspension 116 so that improvements in suspension design will not be hindered by having to integrate a head-slap reduction feature into the design of the suspension itself.

Additionally, the head-slap arrestor 150 may be "tuned" to react with sufficient speed so that the finger tip 166 contacts the suspension 116 before the slider 118 has an opportunity to lift off the disc surface at all. Such tuning is accomplished by selecting the size and the moment arms of the paddle 152 and the finger 164, and by setting a sufficiently small stand-off height of the tip 166 above the suspension 116, so that the net torque 204 generated by the head-slap arrestor 150 will cause the tip 166 of the finger 164 to traverse the relatively small stand-off height before the upward force 200 on the slider 118 and the suspension 116 overcomes the downward preload force applied by the load beam 180. This tendency of the head-slap arrestor 150 to react even before head lift-off can occur further distinguishes the prior art use of cushions or other motion limiters on the suspension which, by necessity, must tolerate at least a minimal lift-off distance to allow for normal vertical movement (i.e., oscillations) of the slider 118 during operation of the drive 100. That is, motion limiters act to reduce the severity of a head-slap by limiting the vertical travel of the slider 118 during a shock event. However, such motion limiters must provide at least a limited amount of vertical travel (i.e., head-slap) to prevent interfering with the normal motion of the suspension 116 and slider 118. On the other hand, the head-slap arrestor 150 of the present invention allows for normal vertical oscillations of the disc 108 by remaining completely passive until a large shock force is experienced.

In addition to countering the initial lift-off tendency of the slider 118 during a shock event, the head-slap arrestor 150 may be configured to reduce the tendency of the arrestor 150 to vibrate or "ring" during the shock event. There are a number of modifications that can be made to the head-slap arrestor 150 to enhance the damping characteristics of the arrestor. Initially, while the head-slap arrestor 150 is preferably formed from a single piece of stainless steel having a thickness of approximately 0.25 millimeters, damping may be improved by altering the thickness of the material or by forming the arrestor from multiple metal pieces. For example, the spring legs 156 and the attachment feet 158 may be formed separately as opposed to bending the legs 156 at the bend region 157. Alternatively, the head-slap arrestor 150 may be formed from a more highly damped material (e.g., a plastic or ceramic material) that would enable the arrestor 150 to more rapidly dissipate vibration energies following the shock event. Such alternative materials are well known to those skilled in the art and the present invention encompasses the use of such alternative materials and construction techniques.

In addition to altering the material used to form the arrestor 150, the present invention encompasses the use of other damping techniques such as the use of an elastomeric filler material 250 (FIG. 2) positioned within the gap formed between the spring leg 156 and the attachment foot 158. The elastomeric material 250 may be a thin piece of foam or may simply constitute a piece of elastomeric tape that is adhered to at least one of the leg 156 or the foot 158. Because the foot 158 is secured to the distal end of the actuator arm 114, contact between the elastomeric material 250 and the spring leg 156 helps to damp vibrations of the paddle 152 (and thus of the finger 164) following a shock event.

Further damping can be provided by providing a damping layer between each attachment foot 158 and the actuator arm 114. While the attachment feet 158 may be secured to the land portions 172 of the actuator arm 114 in a variety of manners (e.g., spot welding or the use of an epoxy adhesive), a double-sided elastomeric tape 254 (FIG. 3) may also be used to secure the feet to the distal end of the arm 114. The tape 254 acts to damp vibrations of the head-slap arrestor 150 and further aids in reducing the transmission of vibrations between the head-slap arrestor 150 and the actuator arm 114.

In one embodiment of the invention shown in FIG. 3, an elastomeric cap 258 or piece of tape is preferably wrapped around the tip 166 of the finger 164. The cap 258 prevents metal-to-metal contact between the tip 166 and the metal suspension 116 and generally acts to damp vibrations caused by contact between the head-slap arrestor 150 and the suspension 116. Additionally, as best shown in FIG. 4, the length of the finger 164 is preferably selected to position the tip 166 above a portion of the load beam 180 that includes opposing stiffening rails 262. The rails 262 are used to reinforce the vertical stiffness of the load beam 180, except in the bend region at the proximal end of the load beam which is bent downward to provide the preload force. Positioning the tip 166 of the finger 164 so that it will contact the load beam 180 between the stiffening rails 262 helps to prevent the tip 166 from sliding off of the load beam during a relatively violent (high G-force) shock event. Indeed, one skilled in the art may devise an interlocking connection between the tip 166 of the head-slap arrestor 150 and the suspension 116 that helps maintain contact and minimize relative motion between the tip 166 and the suspension 116 during a shock event.

Described in another way, a disc drive assembly (such as 100) in accordance with an exemplary preferred embodiment of the present invention has a disc (such as 108) mounted for rotation about a spindle axis. The disc drive assembly (such as 100) further includes an actuator (such as 110) for moving an actuator arm (such as 114) above the surface of the disc (such as 108). A suspension (such as 116) connects a slider (such as 118) to the actuator arm (such as 114) to maintain the slider (such as 116) substantially engaged with the disc surface in the absence of a shock event. A head-slap arrestor (such as 150) is attached to the actuator arm (such as 114) and includes a finger (such as 164) extending over the suspension (such as 116), wherein a distal end (such as 166) of the finger (such as 164) is moveable between a first position at a predetermined height above the suspension (such as 116), in the absence of a shock event, and a second position where the distal end (such as 166) engages the suspension (such as 116) to maintain the slider (such as 118) substantially engaged with the disc surface (such as 108) during a shock event. In preferred embodiments of the invention, the head-slap arrestor (such as 150) includes a paddle (such as 152) attached to a proximal end of the finger (such as 164) along a hinge axis (such as 160). The hinged connection of the paddle (such as 152) and the finger (such as 164) allows for pivoting motion of the paddle and the finger about the hinge axis (such as 160).

In preferred embodiments of the invention, the head-slap arrestor (such as 150) includes a pair of attachment feet (such as 158) secured to the actuator arm (such as 114). The paddle (such as 152) includes a pair of legs (such as 156) where each leg includes a distal end attached to a distal end of a corresponding attachment foot (such as 158) along the hinge axis (such as 160). An elastomeric damping material (such as 250) may be positioned in a gap formed between each attachment foot (such as 158) and a corresponding leg (such as 156) of the paddle (such as 152). Also, in one preferred embodiment, each attachment foot (such as 158) is formed integrally with the corresponding leg (such as 156) of the paddle (such as 152), so that a U-shaped bend region (such as 157) connects the leg (such as 156) of the paddle to the corresponding attachment foot (such as 158) along the hinge axis (such as 160). Further embodiments of the head-slap arrestor (such as 150) may include an elastomeric cover (such as 258) on the distal end (such as 166) of the finger (such as 164).

Another embodiment of the invention may be described as a head-slap arrestor (such as 150) for a disc drive (such as 100) wherein the disc drive includes a disc (such as 108) mounted for rotation about a spindle axis. The disc drive includes an actuator (such as 110) for moving an actuator arm (such as 114) above the surface of the disc (such as 108) and a suspension (such as 116) connecting a slider (such as 118) to the actuator arm (such as 114) to maintain the slider substantially engaged with the disc surface in the absence of a shock event. The head-slap arrestor (such as 150) includes attachment feet (such as 158) adapted to be secured to the actuator arm (such as 114) and a paddle (such as 152) secured to the attachment feet (such as 158) along a hinge axis (such as 160) so that the paddle (such as 152) is suspended above the attachment feet. A finger (such as 164) includes a proximal end attached to the paddle (such as 152) along the hinge axis (such as 160) and a distal end (such as 166) extending away from the paddle so that the paddle (such as 152) and the finger (such as 164) pivot in opposite directions about the hinge axis (such as 160). The distal end (such as 166) of the finger (such as 164) is adapted to extend a predetermined height above the suspension (such as 116) in the absence of a shock event, and is further adapted to pivot about the hinge axis (such as 160) and engage the suspension (such as 116) to maintain the slider (such as 118) substantially engaged with the disc surface (such as 108) during a shock event.

Yet another embodiment of the present invention may be described as a disc drive assembly (such as 100) having a suspension (such as 116) maintaining a slider (such as 118) substantially engaged with a surface of a disc (such as 108) in the absence of a shock event. A means (such as 150) applies a force to the suspension (such as 116) to maintain the slider (such as 118) substantially engaged with the disc surface (such as 108) when the disc drive assembly undergoes a shock event. The means (such as 150) for applying a force to the suspension (such as 116) includes means (such as 152 and 158) for scaling the force to match a force of the shock event. The means (such as 150) for applying a force to the suspension (such as 116) may further include an elongated member (such as 164) pivotally attached to an actuator arm (such as 114) of the disc drive (such as 100), wherein the elongated member (such as 164) does not engage the suspension (such as 116) in the absence of a shock event.

It will be clear that the present invention is well adapted to attain the ends and advantages mentioned as well as those inherent therein. While a presently preferred embodiment has been described for purposes of this disclosure, numerous changes may be made which will readily suggest themselves to those skilled in the art. For example, it is understood that the size and shape of the paddle 152 as well as the size and shape of the finger 164 may be varied by one of skill in the art to better conform to a particular suspension 116. Furthermore, a variety of different methods of attaching the paddle 152 to the actuator arm 114 may be used, provided that the finger 164 is free to pivot against the suspension 116 with the inertial force of the paddle 152. Accordingly, all such modifications, changes and alternatives are encompassed in the spirit of the invention disclosed and as defined in the appended claims.

What is claimed is:

1. A disc drive assembly having a disc mounted for rotation about a spindle axis, the disc having a surface for recording data, the disc drive assembly further including an actuator for moving an actuator arm above the surface of the disc, wherein the actuator comprises:

a suspension connecting a slider to the actuator arm to maintain the slider substantially engaged with the disc surface in the absence of a shock event, the slider including a transducer for reading and writing data to the disc surface; and a head-slap arrestor attached to the actuator arm and including a finger extending over the suspension, wherein a distal end of the finger is moveable between a first position a predetermined height above the suspension in the absence of a shock event and a second position where the distal end engages the suspension to maintain the slider substantially engaged with the disc surface during a shock event.

2. A disc drive assembly as defined in claim 1, wherein the head-slap arrestor includes a paddle attached to a proximal end of the finger along a hinge axis, and wherein the head-slap arrestor is attached to the actuator arm to allow for pivoting motion of the paddle and the finger about the hinge axis.

3. A disc drive assembly as defined in claim 2, wherein a mass of the paddle exceeds a mass of the finger.

4. A disc drive assembly as defined in claim 2, wherein a mass of the paddle exceeds a combined mass of the finger, the suspension and the slider.

5. A disc drive assembly as defined in claim 2 wherein:

the head-slap arrestor includes a pair of attachment feet secured to the actuator arm; and the paddle includes a pair of legs, each leg having a distal end attached to a distal end of a corresponding one of the attachment feet along the hinge axis.

6. A disc drive assembly as defined in claim 5, further comprising an elastomeric damping material positioned in a gap formed between each attachment foot and the corresponding leg of the paddle.

7. A disc drive assembly as defined in claim 5, wherein each attachment foot is formed integrally with the corresponding leg of the paddle, and wherein a U-shaped bend region connects the leg of the paddle to the corresponding attachment foot along the hinge axis.

8. A disc drive assembly as defined in claim 2, wherein an elastomeric cover surrounds the distal end of the finger.

9. A disc drive assembly as defined in claim 2, wherein the finger is formed integrally with the paddle.

10. A head-slap arrestor as defined in claim 1, wherein the finger is formed integrally with the paddle.

11. A head-slap arrestor as defined in claim 10, wherein the finger is bent downward so that the distal end of the finger extends below the paddle.

12. A head-slap arrestor for a disc drive, wherein the disc drive includes a disc mounted for rotation about a spindle axis, the disc having a surface for recording data, the disc drive further including an actuator for moving an actuator arm above the surface of the disc and a suspension connecting a slider to the actuator arm to maintain the slider substantially engaged with the disc surface in the absence of a shock event, the head-slap arrestor comprising:

attachment feet adapted to be secured to the actuator arm;

a paddle secured to the attachment feet along a hinge axis so that the paddle is suspended above the attachment feet; and a finger having a proximal end attached to the paddle along the hinge axis and a distal end extending away from the paddle so that the paddle and the finger pivot in opposite directions about the hinge axis, wherein the distal end of the finger is adapted to extend a predetermined height above the suspension in the absence of a shock event, and wherein the finger is further adapted to pivot about the hinge axis and engage the suspension to maintain the slider substantially engaged with the disc surface during a shock event.

13. A head-slap arrestor as defined in claim 12, wherein a mass of the paddle exceeds a mass of the finger.

14. A head-slap arrestor as defined in claim 13, wherein the paddle includes a pair of legs, each leg having a distal end attached to a distal end of a corresponding one of the attachment feet along the hinge axis.

15. A head-slap arrestor as defined in claim 14, further comprising an elastomeric damping material positioned in a gap formed between each attachment foot and the corresponding leg of the paddle.

16. A head-slap arrestor as defined in claim 14, wherein each attachment foot is formed integrally with the corresponding leg of the paddle, and wherein a U-shaped bend region connects the leg of the paddle to the attachment foot along the hinge axis.

17. A head-slap arrestor as defined in claim 12, wherein an elastomeric cover surrounds the distal end of the finger.

18. A disc drive assembly comprising:

a suspension maintaining a slider substantially engaged with a surface of a disc in the absence of a shock event; and means for applying a force to the suspension to maintain the slider substantially engaged with the disc surface when the disc drive assembly undergoes a shock event.

19. A disc drive assembly as defined in claim 18, wherein the means for applying a force to the suspension includes means for scaling the force to match a force of the shock event.

20. A disc drive assembly as defined in claim 19, wherein the means for applying a force to the suspension further includes an elongated member pivotally attached to an actuator arm of the disc drive, wherein the elongated member does not engage the suspension in the absence of a shock event.

* * * * *